(12) United States Patent
Laming et al.

(10) Patent No.: US 6,574,394 B1
(45) Date of Patent: Jun. 3, 2003

(54) OPTICAL FIBRE GRATING AND OPTICAL FIBER TRANSMISSION SYSTEM USING SUCH OPTICAL FIBER GRATING

(75) Inventors: Richard Ian Laming, Southampton (GB); Wei-Hung Loh, San Jose, CA (US)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/242,722

(22) PCT Filed: Aug. 4, 1997

(86) PCT No.: PCT/GB97/02100

§ 371 (c)(1),
(2), (4) Date: Sep. 30, 1999

(87) PCT Pub. No.: WO98/08121

PCT Pub. Date: Feb. 26, 1998

(30) Foreign Application Priority Data

Aug. 23, 1996 (GB) .............................................. 9617689

(51) Int. Cl.[7] .............................................. G02B 6/34
(52) U.S. Cl. ............................. 385/37; 359/158; 372/6; 385/147
(58) Field of Search ................................ 359/158, 161, 359/177, 183, 156, 160, 236, 338, 341; 372/6, 21, 18; 385/1, 37, 123, 130, 28, 29

(56) References Cited

U.S. PATENT DOCUMENTS 5,078,464 A * 1/1992 Islam ........................... 385/122
5,216,739 A * 6/1993 Hill et al. ..................... 385/123
5,701,319 A * 12/1997 Fermann ....................... 372/18

FOREIGN PATENT DOCUMENTS

| GB | 2 161 612 A | 1/1986 | |
| GB | 2161612 | * 1/1986 | ................... 385/37 |

OTHER PUBLICATIONS

P. Niay et al., "Polarization Selectivity of Gratings Written in Hi–Bi Fibers by the External Method", IEEE Photonics Technology Letters, 7(4):391–393 (1995).
R. Kashyap et al., "30ps Chromatic Dispersion Compensation of 400fs Pulses at 100 Gbits/s in Optical Fibres Using an all Fibre Photoinduced Chirped Reflection Grating", Electronics Letters, 30 (23) :1078–1080, (1994).
S.V. Chernikov et al., "All–Fiber Dispersive Transmission Filters Based on Fiber Grating Reflectors", Optics Letters, 20(14):1586–1588, (1995).
K. Hill et al., "Chirped In–Fiber Bragg Gratings for Compensation of Optical–Fiber Dispersion", Optics Letters, 19(17):1314–1316, (1994).

(List continued on next page.)

Primary Examiner—Akm E. Uliah
(74) Attorney, Agent, or Firm—Finnegan, Henderson, Farabow, Garrett & Dunner, L.L.P.

(57) ABSTRACT

An optical fiber transmission system includes an optical transmitter for generating light; a dispersive optical fiber link optically coupled to the optical transmitter, for transmitting the light generated by the optical transmitter; and a chirped optical fiber grating, optically coupled to the optical transmitter and to the dispersive optical fiber link, for providing at least a partial dispersion compensation to the light generated by the optical transmitter, before the light is transmitted in the dispersive optical fiber link; the chirped optical fiber grating including a polarization-maintaining optical fiber having a chirped refractive index variation

13 Claims, 4 Drawing Sheets

OTHER PUBLICATIONS

D. Taverner et al., "Dispersion Compensation of 16ps Pulses Over 100km of Step–Index Fibre Using Cascaded Chirped Fibre Gratings", Electronics Letters, 31(12):1004–1006, (1995).

Anderson, D.Z. et al., "Production of in–fibre gratings using a diffractive optical element," *Electron. Lett.*, vol. 29, pp. 566–568 (1993) (No date).

Cole, M.J., et al., "Moving fibre phase mask–scanning beam technique for enhanced flexibility in producing fibre gratings with uniform phase mask," *Electron. Lett.*, vol. 31, pp. 1488–1490 (1995) (No date).

Garthe, D. et al., "Adjustable dispersion equaliser for 10 and 20 Gbit/s over distances up to 160 km," *Electron. Lett.*, vol. 30, pp. 2159–2160 (1994) (No date).

Hill, K.O. et al., "Bragg gratings fabricated in monomode photosensitive optical fiber by UV exposure through a phase mask," *Applied Physics Lett.*, vol. 62, pp. 1035–1037 (1993) (No date).

Krug, P.A. et al., "270 km transmission at 10 Gbit/s in non–dispersion shifted fibre using an adjustably chirped 120 mm fibre Bragg grating dispersion compensator," *Conf. Opt. Fiber Comm.*, paper PDP27 (1995) (No date).

Laming, R. I. et al., "A dispersion tunable grating in a 10 Gbit/s 100–220 km step index fiber link," *IEEE Photon. Technol. Lett.* (Mar. 1996) (No date).

Loh, W. H. et al., "10 cm chirped fibre Bragg grating for dispersion compensation at 10 Gbit's over 400 km of non–dispersion shifted fibre," *Electron. Lett.*, vol. 31, pp. 2203–2204 (1995) (No date).

Loh, W. H. et al., "Dispersion compensation over distances in excess of 500 km for 10 Gbit's systems using chirped fibre gratings," *IEEE Photonics Technology Letters*, vol. 5, pp. 944–946 (1996) (No date).

Martin, J. et al., "Novel writing technique of long and highly reflective in–fibre gratings," *Electron. Lett.*, vol. 30, pp. 811–812 (1994) (No date).

Meltz, G. et al., "Formation of Bragg gratings in optical fibers by a transverse holographic method," *Opt. Lett.*, vol. 14, pp. 823–825 (1989) (No date).

Ouelette, F. et al., "Broadband and WDM dispersion compensation using chirped sampled fibre Bragg gratings," *Electron. Lett.*, vol. 31, pp. 899–900 (1995) (No date).

Ouellette, F., "Dispersion cancellation using linearly chirped Bragg grating filters in optical waveguides," *Opt. Lett.*, vol. 12, pp. 847–849 (1987) (No date).

Rourke, H.N. et al., "Fabrication and characterisation of long, narrowband fibre gratings by phase mask scanning," *Electron. Lett.*, vol. 30, pp. 1341–1342 (1994) (No date).

* cited by examiner

OPTICAL FIBRE GRATING AND OPTICAL FIBER TRANSMISSION SYSTEM USING SUCH OPTICAL FIBER GRATING

CROSS-REFERENCE TO RELATED APPLICATIONS

This application is a National Stage of International Application No. PCT/GB97/02100, filed on Aug. 4, 1997, which claims priority to UK patent application No. 9617689.6 filed on Aug. 23, 1996, the contents of which are relied upon and hereby incorporated herein by reference.

BACKGROUND OF THE INVENTION

Field of the Invention

This invention relates to an optical fibre grating and to an optical fibre transmission system using such optical fibre grating.

Long distance transmission at 10 Gbit/s over standard telecommunications fibre is of great interest because of the large base of such fibres already installed in the ground currently supporting low bit-rate systems.

The low loss of these already installed fibres, together with the ready availability of erbium doped fibre amplifiers (EDFAs), make the 1.55 $\mu$m window an attractive wavelength region of operation. Unfortunately, however, the group velocity dispersion of these fibres is relatively large within this window, which severely limits the transmission distances achievable unless compensating techniques are employed.

Of the variety of methods which have been suggested thus far to solve this problem, linearly chirped fibre gratings as dispersion compensators are potentially very attractive, as they are compact, totally passive, and relatively simple to fabricate.

Progress in the development of fibre gratings has been rapid in the last few years, especially with the introduction of the phase mask technique, which provides a high degree of reproducibility in the gratings fabricated, as well as relaxing the tolerances on the fabrication set-up. In addition, longer fibre gratings are more readily realised with this approach than with the holographic technique. This is a crucial factor in dispersion compensation where the maximum compensatable distance is expected to scale directly with the grating length. Reports of experimental demonstrations of fibre compensation over standard fibre links, from 160 km, 220 km, to 270 km, were accomplished with gratings 4 cm to 12 cm long. With 10 cm long phase masks now commercially available, and even longer masks a likely prospect in the near future, fibre gratings capable of compensating over wide optical bandwidths and much longer distances should be feasible.

Recently, it has been experimentally demonstrated that dispersion compensation to 400 km of standard single mode fibre is possible, with a 3 dB power penalty, using a 10 cm long chirped fibre grating and an unchirped externally modulated transmitted. In separate experiments using a chirped externally modulated transmitter, transmission over 403 km with negligible penalty has been demonstrated and it has been shown that up to 537 km is possible with the use of two chirped gratings cascaded together.

SUMMARY OF THE INVENTION

This invention provides a chirped optical fibre grating formed by impressing a chirped substantially periodic refractive index variation on a polarisation-maintaining optical fibre.

This invention also provides an optical fibre transmission system comprising:

an optical transmitter;

a dispersive optical fibre link; and a chirped optical fibre grating connected at or near to the input of the link to provide at least partial dispersion compensation to the light to be launched along the link, the grating being formed of polarisation-maintaining optical fibre and having a principal axis substantially aligned with a polarisation axis of light received from the optical transmitter.

The invention recognises that a dependence of system sensitivity on the input polarisation state to the grating can occur, due to polarisation mode dispersion (PMD) in linearly chirped dispersion compensating fibre gratings, and that this can give rise to a deterioration in the performance of optical transmission systems relying on such gratings for fibre dispersion compensation.

The invention addresses this problem by providing a polarisation-maintaining optical fibre grating, e.g. a chirped grating for dispersion compensation. The axes of the polarisation maintaining fibre of the grating can then be aligned with a polarisation axis of the light to be transmitted through a fibre transmission system.

The skilled man will understand that the term "polarisation maintaining fibre" refers to optical fibre having an optically asymmetric cross section, and typically a birefringence of greater than about $10^{-4}$.

BRIEF DESCRIPTION OF THE DRAWINGS

The invention will now be described by way of example only with reference to the accompanying drawings in which.

DESCRIPTION OF PREFERRED EMBODIMENT

Figure 1:
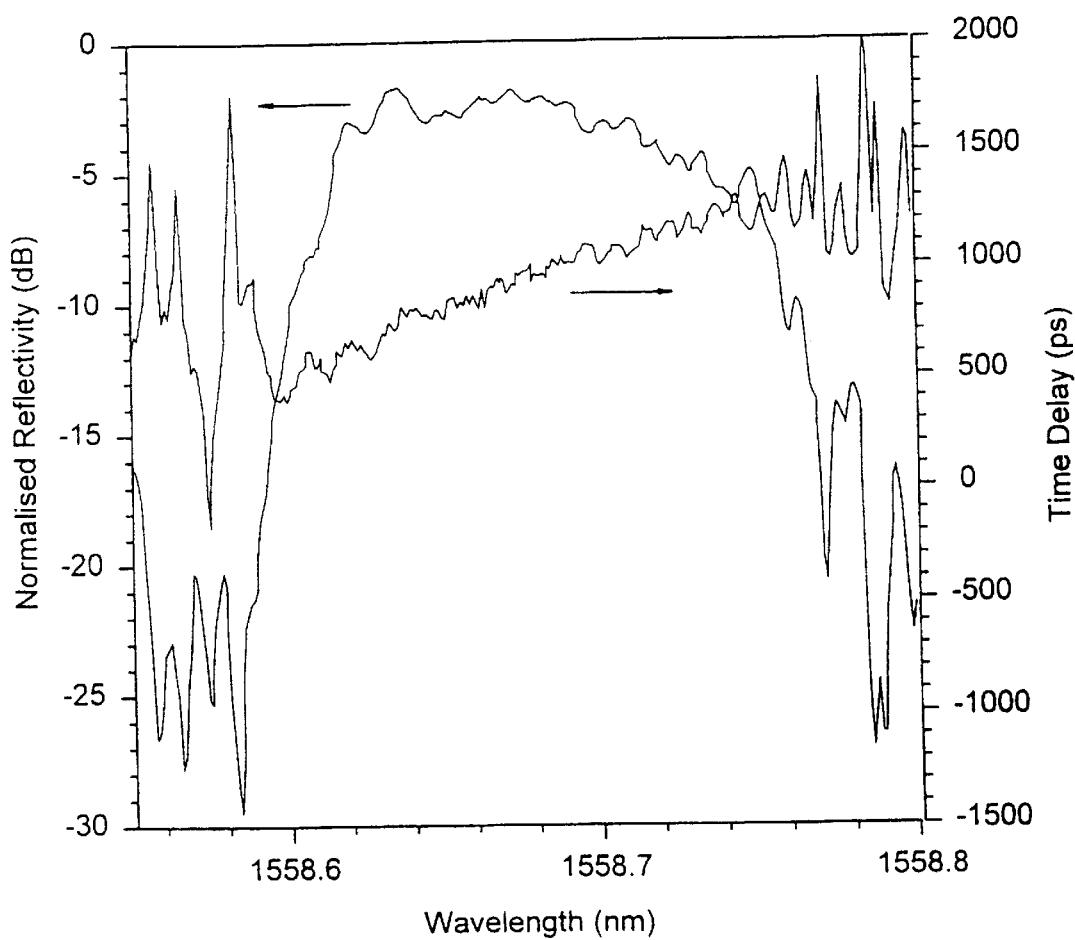
FIG. 1 is a schematic graph showing the reflection and time delay characteristics of a conventional chirped optical fibre grating.

The measured reflectivity and dispersion characteristics of a typical (conventional) chirped fibre grating are shown in FIG. 1. To fabricate this example, a 10 cm long uniform phase mask from QPS Technology was used. Apodisation and chirping of the grating was accomplished during the writing process using the moving fibre-scanning beam technique (as described, for example, in M. J. Cole, W. H. Loh, R. I. Laming, M. N. Zervas and S. Barcelos, 'Moving fibre/phase mask-scarining beam technique for enhanced flexibility in producing fibre grating with uniform phase mask', *Electron. Lett.*, vol 31, pp. 1488–1490, 1995), with a cosine apodisation profile being adopted to reduce excessive ripples in the refection/dispersion spectra.

This example grating exhibits a peak reflectivity of –50%, 3 dB bandwidth of 0.12 nm and 5400 ps/nm. dispersion. The grating is thus able to compensate for dispersion of 320 km of standard single mode fibre (17 ps/nm.km) (as described, for example, in W. H. Loh, R. I. Laming, N. Robinson, A. Cavaciuti, F. Vaninetti, C. J. Anderson, M. N. Zervas and M.

J. Cole, 'Dispersion compensation over distances in excess of 500 km for 10 Gbit/s systems using chirped fibre gratings', submitted to IEEE Photonics Technology Letters). These measurements, although made with a polarised tunable laser, employed a polarisation insensitive receiver and are thus insensitive to and do not reveal the PMD in the grating.

All optical fibres exhibit a degree of birefringence B, due to slight core elipticity or anisotropic stress which gives rise to a difference between the refractive index and thus the mode propagation constants of the two principal axis, the fast and slow axes. The birefringence is defined as the difference between the mode indices $n_s$ and $n_f$ for the slow and fast axis $$B = \Delta n = n_s - n_f$$

For standard optical fibre B is typically in the range $-10^{-5}$–$10^{-6}$ whilst in high birefringence, polarisation maintaining fibre it can be as high as $-10^{-3}$. The effect of fibre birefringence on a chirped fibre grating is to split the reflection spectra for the fast and slow axis by $\Delta\lambda = 2B\Lambda = B\lambda/n$. Here $\Lambda$ is the grating pitch, $\lambda$ the grating central wavelength and n the average mode index.

Figure 2A:
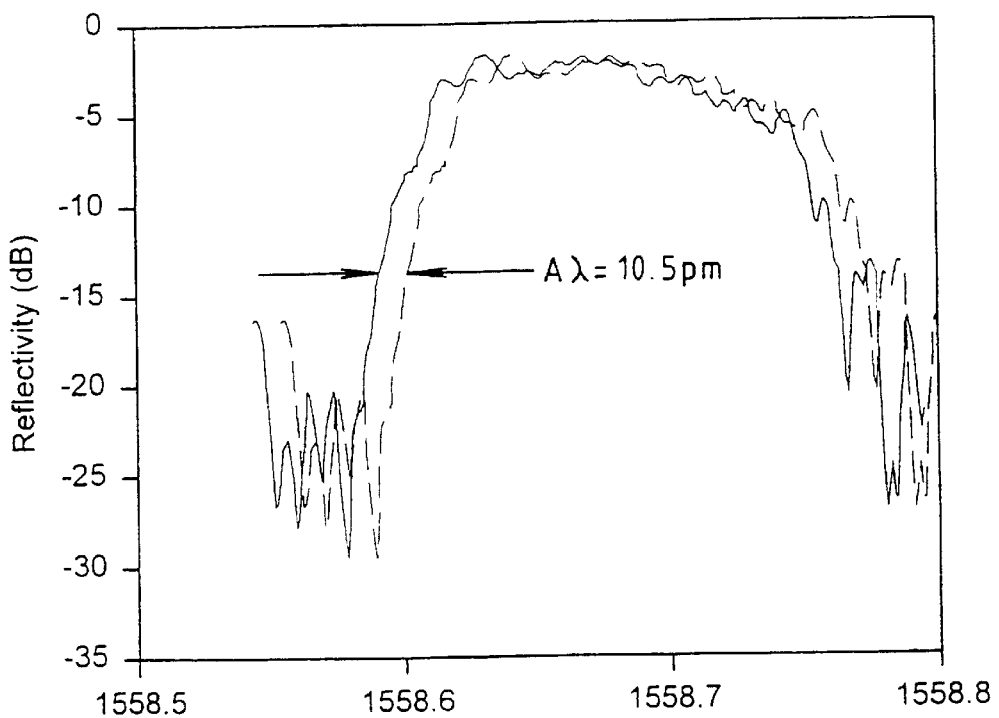
FIGS. 2a and 2b are schematic graphs illustrating the reflection and time delay characteristics for such a grating written into a fibre with a birefringence of $10^{-5}$.
Figure 2B:
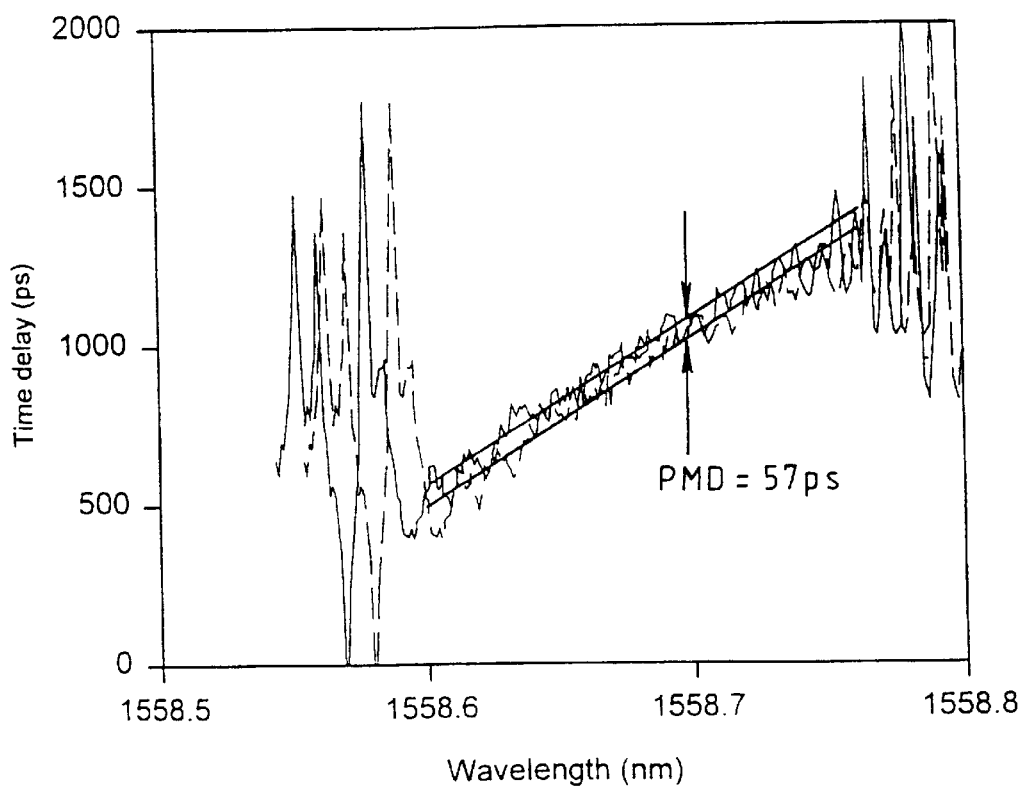

This effect is indicated schematically in FIGS. 2a and 2b, which are schematic graphs illustrating the reflection and time delay characteristics for such a grating written into a fibre with a birefringence of $10^{-5}$.

As a result of the PMD, the time delay (dispersion) curves are wavelength shifted for the two polarisations.

The PMD is given by PMD=$\Delta\lambda D=2B\Lambda D=B\lambda D/n$ where D is the grating dispersion.

In this case the PMD would be –60 ps which is significant compared to the bit period (100 ps for a 10 Gbit/s non-return to zero, NRZ system). As a rule of thumb for reliable system operation, the total link PMD should be less than 1/10th of the bit-period. Taking into account the PMD of other components in the link fabricating the grating in high quality fibre with low B of $-10^{-6}$, as in references 12 and 13, will not be sufficient for long term reliable system operation since the input polarisation state to the grating may vary over time. The problem will be even worse for longer transmission distances where the dispersion and thus PMD of the grating will be larger.

It has thus been recognised that PMD in linearly chirped fibre gratings is likely to be a severe limitation to their future application.

This problem is overcome in the present embodiments of the invention by fabricating the grating in high birefringence polarisation maintaining fibre such as Fibrecore Bow-Tie fibre or Fujikura Panda fibre.

Figure 3:
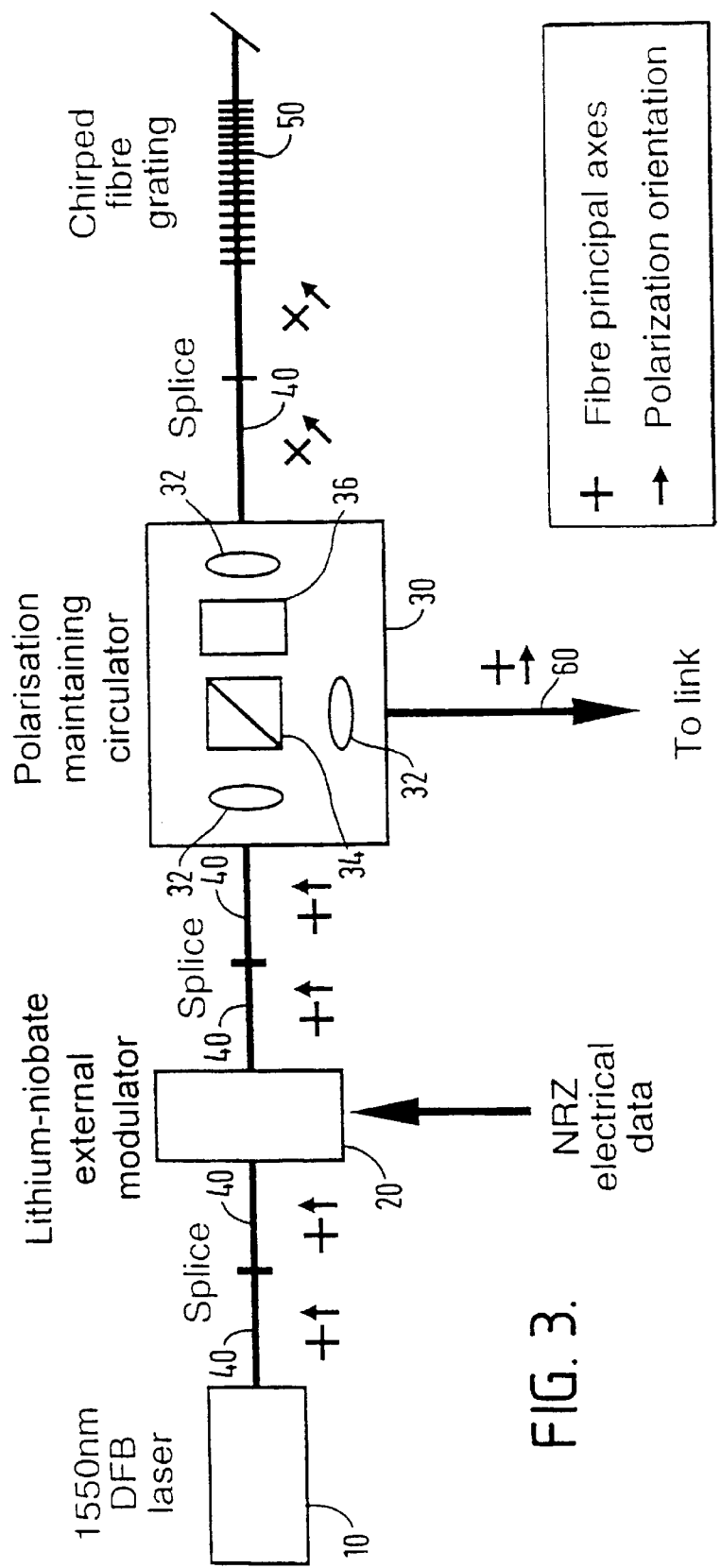
FIG. 3 schematically illustrates an optical transmission system incorporating polarisation mode dispersion compensation.

In a first embodiment shown schematically in FIG. 3, the polarisation state of a laser transmitter 10 is maintained through an external modulator 20 and a polarisation maintaining circulator 30 by the use of polarisation maintaining fibre pigtails 40 aligned to one of the principal axes of high birefringence optical fibre used to fabricate the dispersion compensating grating 50. On reflection, light is output from the third port 60 of the circulator. Since only one polarisation mode of the grating 50 is excited, the PMD in the grating is eliminated.

The polarisation maintaining circulator 30 comprises input/output lenses 32 at each port, a polarisation beam splitter 34 and a Faraday rotator 36. Light entering the circulator at the input port (shown on the left in FIG. 3) is arranged to be in a polarisation that passes through the polarisation beam splitter 34 towards the second port of the circulator (on the right in FIG. 3). The light is rotated by 45° in the rotator 36. The grating 50 and the fibre pigtail at the second port of the circulator are arranged with their principal axes rotated by 45° with respect to the axes of the input to the circulator. Light reflected from the grating is then further rotated by 45° by the rotator, into the polarisation which is diverted by the polarisation beam splitter 34. This light is therefore diverted to the third, output port 60 of the circulator.

Another embodiment could instead use a commercially available polarisation maintaining circulator such as the Model SPFC 210071000 from E-Tek Dynamics Inc, San Jose, Calif.

Figure 4:
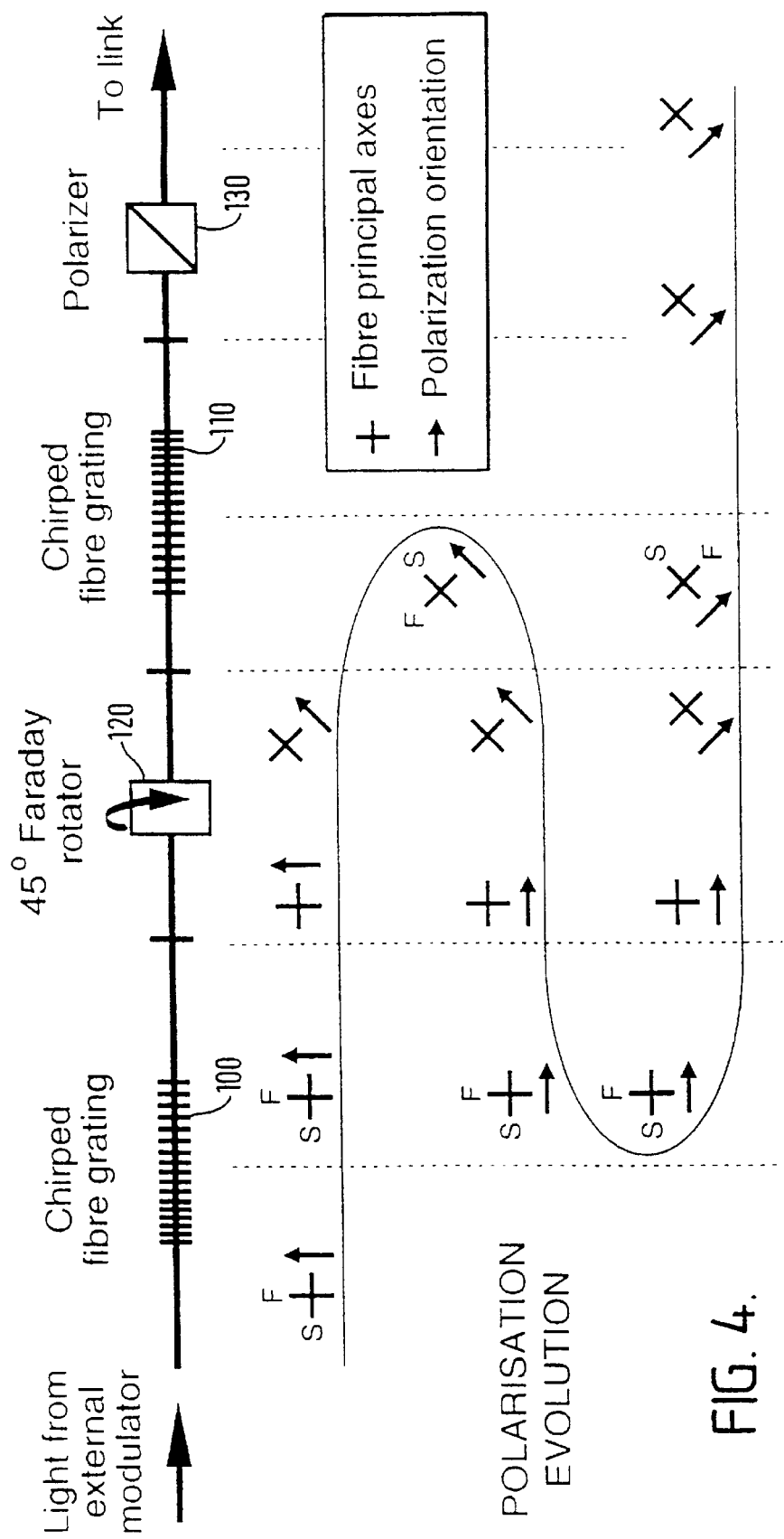
FIG. 4 schematically illustrates another optical transmission system incorporating polarisation mode dispersion compensation.

FIG. 4 schematically illustrates another embodiment in which two chirped gratings 100, 110 are formed in high birefringence polarisation maintaining fibre with axes aligned, and a 45° Faraday rotator 120 is placed in-between.

With a grating fibre birefringence of $10^{-3}$, the reflection spectra for the fast and slow axes are separated by –1 nm; thus for grating and signal bandwidths less than 1 nm, and with the signal wavelength positioned correctly (i.e. substantially aligned) with respect to one or other of the two spectra, the hi-bi fibre gratings are effectively transparent for one polarisation state of the light, along say, the fast axis, but reflecting for light on the other axis.

The principle of operation of this configuration is then simply explained as follows, assuming that in this case the transmitter wavelength is selected so that the fast axis is transmitting and the slow axis reflecting.

Light from the external modulator (not shown in FIG. 4), polarised along, say, the fast-axis, is first transmitted through the grating 100, undergoes a 45° rotation by the Faraday rotator 120 and hence is launched into the slow-axis of grating 2. It is thus reflected by grating 110, and undergoes a further 45° rotation to now be launched into the slow-axis of grating 100, where it is reflected. Passing once more through the Faraday rotator, it gets launched into the fast-axis of grating 110, which is transparent to the signal, and hence the signal is finally transmitted out into the system.

Light initially launched along the slow axis of the grating 100 is simply reflected back from the grating 100.

An output polariser 130 is used to block any output light in the unwanted polarisation, and therefore to improve further the performance of the system, because the polarisation rejection by the grating is not 100% efficient.

With this configuration, the total dispersion compensated is the sum of the dispersion of the two gratings 100 and 110.

What is claimed is:

1. An optical fibre transmission system, comprising:
   an optical transmitter for generating light;
   a dispersive optical fibre link optically coupled to the optical transmitter, for transmitting the light generated by the optical transmitter; and
   chirped optical fibre grating optically coupled to the optical transmitter and to the dispersive optical fibre link to provide at least a partial dispersion compensation to the light generated by the optical transmitter, before the light is transmitted in the dispersive optical fibre link;
   wherein the chirped optical fibre grating comprises a polarisation-maintaining optical fibre having a chirped refractive index variation.

2. An optical fibre transmission system according to claim 1, further comprising a polarisation-maintaining optical circulator having at least first, second and third input/output ports, the first port being optically connected to the optical transmitter, the second port being optically connected to the chirped optical fibre grating, and the third port being optically connected to the dispersive optical fibre link.

3. An optical fibre transmission system according to claim 1, wherein said chirped optical fibre grating is a first chirped optical fibre grating comprising a first polarisation-maintaining optical fibre having a chirped refractive index variation and having one of its principal axes aligned with the light generated by the optical transmitter;

and wherein the optical fibre transmission system further comprises:

a second chirped optical fibre grating positioned between the first chirped optical fibre grating and the dispersive optical fibre link, the second chirped optical fibre grating comprising a second polarisation-maintaining optical fibre having a chirped refractive index variation and having principal axes rotated by about 45° with respect to the principal axes of the first chirped optical fibre grating; and a polarisation rotator of approximately 45° positioned between the first and the second chirped optical fibre gratings.

4. An optical fibre transmission system according to claim 3, further comprising an optical polariser positioned between the second chirped optical fibre grating and the dispersive optical fibre link.

5. The optical fibre transmission system of claim 1, wherein the chirped optical fibre grating has a principal axis substantially aligned with a polarisation axis of the light generated by the optical transmitter.

6. The optical fibre transmission system of claim 2, wherein the polarisation-maintaining optical circulator comprises:

a polarisation beam splitter adapted to transmit light having a first polarisation from the first port to the second port and to reflect light having a second polarisation from the second port to the third port; and a polarisation rotator positioned between the polarisation beam splitter and the second port.

7. An optical fibre transmission system according to claim 1, wherein the chirped optical fibre grating is arranged such that the light emitted by the optical transmitter is reflected by the chirped optical fibre grating before being transmitted into the dispersive optical fibre link.

8. An optical fibre transmitter unit comprising:

an optical transmitter for generating light; and a chirped optical fibre grating optically coupled to the optical transmitter to provide at least partial dispersion compensation to the light generated by the optical transmitter, wherein the chirped optical fibre grating comprises a polarisation-maintaining optical fibre having a chirped refractive index variation.

9. The optical fibre transmitter unit of claim 8, further comprising a polarisation-maintaining optical circulator having at least first, second and third input/output ports, the first port being optically connected to the optical transmitter, the second port being optically connected to the chirped optical fibre grating, and the third port being optically connected to an output of the transmitter unit.

10. The optical fibre transmitter unit of claim 8, wherein the chirped optical fibre grating comprises:

a first chirped optical fibre grating comprising a first polarisation-maintaining optical fibre having a chirped refractive index variation and having one of its principal axes aligned with the light generated from the optical transmitter; and wherein the optical fibre transmission unit further comprises:

a second polarisation-maintaining optical fibre having a chirped refractive index variation and having principal axes rotated by about 45° with respect to the principal axes of the first chirped optical fibre grating, and a polarisation rotator of approximately 45° positioned between the first and the second chirped optical fibre gratings.

11. The optical fibre transmitter unit of claim 10, further comprising an optical polariser positioned after the second chirped optical fibre grating.

12. The optical fibre transmitter unit of claim 8, wherein the chirped optical fibre grating is arranged such that the light emitted by the optical transmitter is reflected by the chirped optical fibre grating before being transmitted into a dispersive optical fibre link.

13. A method of inputting light into a dispersive optical fibre link comprising the steps of:

providing light in a polarized state from an optical transmitter;

providing at least partial dispersion compensation to the light with a chirped optical fibre grating formed of polarisation-maintaining optical fibre having a principal axis substantially aligned with a polarisation axis of the polarised state of the light from the optical transmitter; and inputting the light after the at least partial dispersion compensation into a dispersive optical fibre link.

* * * * *

UNITED STATES PATENT AND TRADEMARK OFFICE
CERTIFICATE OF CORRECTION

PATENT NO.    : 6,574,394 B1
DATED         : June 3, 2003
INVENTOR(S)   : Richard Ian Laming et al.

It is certified that error appears in the above-identified patent and that said Letters Patent is hereby corrected as shown below:

Title page, Item [54] and Column 1, lines 2 and 3,
Title, "FIBER" should read -- FIBRE -- (both occurrences).

Title page,
Item [75], Inventors, "Southampton" should read -- Edinburgh --.

Column 6,
Lines 19-20, after "comprises", insert
-- a second chirped optical fibre grating positioned after the first chirped optical fibre grating, --.

Signed and Sealed this

Second Day of March, 2004

JON W. DUDAS
*Acting Director of the United States Patent and Trademark Office*